Patented Mar. 14, 1950

2,500,149

UNITED STATES PATENT OFFICE 2,500,149

SULFONATION OF COPOLYMERS OF MONO-VINYL- AND POLYVINYL-AROMATIC COMPOUNDS

Raymond F. Boyer, Midland, Mich., assignor to The Dow Chemical Company, Midland, Mich., a corporation of Delaware No Drawing. Application February 21, 1947, Serial No. 730,188

9 Claims. (Cl. 260—79.3)

1

This invention concerns an improved method of sulphonating substantially insoluble copolymers of a major amount of a monovinyl-aromatic compound and a minor amount of a polyvinyl-aromatic compound. It pertains especially to the sulphonation of copolymers of styrene and divinylbenzene. The invention is concerned more particularly with an improved method of producing the sulphonated copolymers in the form of granules, preferably of spherical or egg-shaped form and nearly free of unduly fine particles of smaller than 60 mesh size, which method involves sulphonation of the copolymers in the manner hereinafter described.

Substantially insoluble copolymers of a major amount of a monovinyl-aromatic compound and a minor amount of a polyvinyl-aromatic compound, and also sulphonated derivatives of such copolymers are known to the art. Such copolymers of styrene and minor amounts of divinylbenzene are disclosed in U. S. Patent 2,089,444. A variety of other copolymers of monovinyl- and polyvinyl-aromatic compounds are mentioned in U. S. Patent 2,366,007 which discloses that any such copolymer may be sulphonated by heating the finely-ground copolymer together with a sulphonating agent such as concentrated sulphuric acid, fuming sulphuric acid, or chlorosulphonic acid, and that, after being washed free of excess sulphonating agent, the sulphonated resin is useful as a cation exchange agent.

Although substantially insoluble sulphonated resins having high cation-absorptive capacities and possessing good ion exchange properties may be prepared by the method of the above-mentioned Patent 2,366,007, it is difficult by said method to obtain a high yield of the sulphonated resin in the form of stable granules of sizes and physical form well adapted to use in usual ion exchange processes, e. g. for the softening or the purification of water. The difficulties which are encountered may be summarized as follows.

The copolymers of monovinyl- and polyvinyl-aromatic compounds, and also their sulphonation products, are hard, brittle resins which are susceptible to cracking, spalling, or shattering when subjected to internal strain or to large external stresses or blows. For most ion exchange purposes it is important that a major portion, e. g. 80 per cent by weight or more, of the sulphonated resin be in the form of granules of from 10 to 60, preferably from 20 to 40, mesh size since smaller particles tend to be washed from a bed of the resin during upflow of water through the bed and granules of larger sizes tend to develop

2 excessive internal strains and to undergo shattering and spalling with formation of fine particles both during preconditioning for use in ion exchange processes and during use as an ion exchange agent in such processes.

I have been informed that the difficulties just mentioned may partially be overcome by producing the aforementioned copolymers directly in the form of rounded, e. g. spherical or egg-shaped, granules of the desired sizes, sulphonating the granules by direct treatment with concentrated sulphuric acid or other sulphonating agents and, after completing the sulphonation reaction, thoroughly wetting the granules with an aqueous solution, of from 5 to 40 per cent concentration, of an ionizable inorganic compound other than ammonium hydroxide and incapable of reacting with sulphuric acid to form a water-insoluble sulphate and, when such solution in contact with the granules is of greater than 10 per cent concentration, reducing its concentration, e. g. by addition of water, gradually or in stepwise manner until it is of about 5 per cent concentration or lower. Thereafter the granules may be washed with water and be employed as ion exchange agents in usual processes for softening or purifying water. Examples of inorganic compounds which may be used as solutes in the aqueous solutions used to wet the freshly sulphonated resin are phosphoric acid, sulphuric acid, hydrochloric acid, hydrobromic acid, sodium chloride, sodium sulphate, potassium chloride, potassium bromide, magnesium chloride, sodium carbonate, potassium carbonate, sodium hydroxide, or potassium hydroxide, etc. During reduction of the concentration of soluble ionizable compounds in the liquor in contact with the sulphonated granules, the latter undergo a small but appreciable amount of swelling. The gradual or stepwise reduction in concentration of such liquor reduces the proportion of resin granules which become shattered or spalled below that which takes place when the freshly-formed sulphonated resin is washed, or otherwise wetted, directly with water. This is due, presumably, to a reduction in internal strains developed within the sulphonated granules during the swelling which takes place in conditioning them for use in ion exchange processes. The gradual or stepwise dilution procedure may be applied with advantage in conditioning the sulphonated resin granules, regardless of whether the latter be substantially spherical or be of irregular shapes such as are produced by grinding a mass of resin.

Although direct production of the copolymer as rounded granules of desired size and, after sulphonation of the granules, gradual dilution of the concentration of ionizable solutes in the liquor in contact with the granules reduces greatly the proportion of resinous material lost due to formation of undesirably fine particles, said known operations often fail to prevent cracking, shattering, or spalling of a considerable proportion of the granules during the steps of sulphonating the same, of conditioning the sulphonated granules for use in ion exchange processes, and during subsequent use of the granules as ion exchange agents.

I have found that the time required for sulphonation of the granular copolymers may be shortened materially and the amount of material lost due to cracking, shattering or spalling during, and subsequent to, the sulphonation step may be reduced by first swelling the granular copolymer by contact with an organic liquid appreciably soluble in the copolymer and subjecting the resultant swollen granules to the action of a sulphonating agent. Apparently such preliminary swelling of the granules facilitates penetration of the sulphonating agent throughout each resin granule and results in more rapid and uniform sulphonation than would otherwise be possible. The increase in uniformity of sulphonation throughout each granule presumably reduces the amount of internal strain developed within the granules during sulphonation and also during the subsequent operations of conditioning the sulphonated granules and of using them in ion exchange processes.

Such operation of swelling a copolymer of monovinyl- and polyvinyl-aromatic compounds prior to sulphonation may be applied with advantage, regardless of the physical form of the body of copolymer to be sulphonated, e. g. it may be applied in effecting the sulphonation of continuous masses, rods, sheets, or irregular shaped granules of the copolymer, or in sulphonating the rounded granules of the copolymer which are preferably employed when the sulphonated product is to be used as an ion exchange agent. Said operation may also be applied with advantage in conjunction with the aforementioned known operations of gradually reducing the concentration of ionizable solutes in the liquor in contact with the resin after sulphonation of the latter.

Examples of copolymers of monovinyl- and polyvinyl-aromatic compounds which may be employed in practice of the invention are the copolymers of a minor amount of divinylbenzene with a major amount of one or more of the compounds: styrene, vinyl-toluene, vinyl-xylene, or ortho-, meta-, or para-chloro-styrene, etc. In place of divinylbenzene, methyl-divinylbenzene, ethyl-divinylbenzene, or a mixture of one or both of these compounds with divinylbenzene may be used. The polyvinyl-aromatic compound is usually employed in amount corresponding to between 3 and 20, preferably between 6 and 11 per cent of the combined weight of the same and the monovinyl-aromatic compound, but it may be used in smaller or larger proportions if desired.

Polymerization of a mixture of monovinyl- and polyvinyl-aromatic compounds may be effected in known ways, e. g. en masse; or in solution in an inert solvent such as benzene, toluene, or ethylbenzene; or while suspended in, or emulsified with, water or other liquid non-solvent for the polymerizable compounds. When carrying the polymerization out en masse, the mixture of starting materials is usually heated at temperatures which are gradually increased from 50° C. or lower to about 150° C. over a period of a week or more. After completing the polymerization reaction the copolymer is ground, cut, or otherwise reduced to granules of sizes suitable for use in ion exchange processes, e. g. of from 10 to 60 and preferably from 20 to 40 mesh size.

The polymerization is preferably accomplished by stirring and heating, e. g. at 50°–150° C., a suspension of the polymerizable compounds in water or an aqueous solution of a protective colloid or thickening agent such as starch, gum tragacanth, or methyl cellulose, etc. By such polymerization while suspended in a liquid medium, the copolymer may be obtained directly in the form of rounded and nearly spherical granules. The size of the granules may be controlled, e. g. by the rate of stirring and the proportion of protective colloid or thickening agent employed, so as to obtain nearly all of the product as granules of sizes suitable for use in ion exchange processes.

The copolymers produced in either of the ways just described are substantially insoluble in most organic solvents. However, they are capable of being swelled to an appreciable extent by contact with organic liquids capable of swelling, and preferably of dissolving, polystyrene, due presumably to such organic liquids being soluble to a limited extent in the copolymers. Examples of organic liquids which may be used to cause swelling of the copolymers are benzene, toluene, xylene, ethylbenzene, isopropylbenzene, chlorobenzene, tetrachloroethane, and tetrachloroethylene, etc.

The increases in rate and uniformity of sulphonation of the copolymers which is brought about by preliminary swelling of such copolymer with an organic liquid are dependent upon the amount of swelling accomplished and become more pronounced with increase in the extent of swelling. The extent of swelling of such copolymer by an organic liquid is, in turn, dependent upon a number of factors such as the identity of the copolymer, particularly the relative proportions of monovinyl- and polyvinyl-aromatic compounds chemically combined in the copolymer, and the kind and proportion of organic liquid employed to effect the swelling action. In general, the amount of swelling accomplished by treatment of such copolymer with an excess of a given organic liquid becomes less with increase in the proportion of polyvinyl-aromatic compound chemically combined in the copolymer. Copolymers of monovinyl- and polyvinyl-aromatic compounds containing less than 20 per cent by weight of the chemically combined polyvinyl-aromatic compound may be swollen by treatment with a swelling-agent, or solvent, for polystyrene to a degree permitting appreciable increases in the rate and uniformity of sulphonaation over those obtainable by direct sulphonation, under otherwise similar conditions, of the unswollen copolymer. Also, the readiness with which such swollen or unswollen copolymer undergoes sulphonation decreases with increase in the proportion of chemically combined polyvinyl-aromatic compound in the copolymer. On the other hand, the hardness of the sulphonated copolymers becomes greater, and the extent to which they undergo swelling or shrinkage on change in the concentration of ionizable solutes in aqueous liquids contacted therewith becomes less, with increase in the proportion of a polyvinyl-aromatic compound chemically combined in the copolymer.

The copolymers of monovinyl- and polyvinyl-aromatic compounds employed in practice of the invention are advantageously ones containing less than 20, e. g. from 3 to 20 and preferably from 6 to 11, per cent by weight of the chemically combined polyvinyl-aromatic compound. Swelling of such copolymer may be accomplished by forming the copolymer in the presence of an organic liquid, e. g. benzene, toluene, or acetone, etc., capable of swelling or dissolving polystyrene. It is preferably accomplished by treating the preformed copolymer with 5 per cent of its weight or more, usually from 10 to 50 per cent, of one or more of the aforementioned organic liquids capable of swelling, and preferably of dissolving, polystyrene. The organic liquid may be used in as large a proportion as desired, but any excess of the liquid is preferably drained from the copolymer prior to the sulphonation. The treatment is usually accomplished at room temperature or thereabout and at atmospheric pressure, but it may be carried out at higher temperatures and pressures, e. g. at temperatures of from 10° to 200° C. and pressures sufficient to prevent complete vaporization of the organic liquid. In this manner, granules of the copolymer, prepared in either of the ways hereinbefore described, may be swollen so as to facilitate subsequent sulphonation of the same. In some instances, the degree of swelling is slight and barely perceptible, but it is effective for the purpose of the invention.

A body of the swollen copolymer granules is sulphonated by reaction with usual sulphonating agents such as concentrated sulphuric acid, fuming sulphuric acid, or chlorosulphonic acid, etc. In practice, the sulphonation is usually accomplished by treating the granular material with an excess, e. g. from 2 to 7 times its weight, of concentrated sulphuric acid and heating the mixture at temperatures of from 100° to 200° C., preferably from 150° to 180° C. Sulphonation is usually continued until the product contains an average of 0.1 or more, e. g. from 0.3 to 1, sulphonic acid radical per aromatic nucleus in the copolymer, as determined from the neutral equivalent of a sample of the sulphonated product.

During the sulphonation reaction, the organic liquid used to effect preliminary swelling of the copolymer may be vaporized or undergo sulphonation. These occurrences have not interfered appreciably with the effectiveness of the preliminary swelling step in facilitating sulphonation of the copolymer, e. g. even though it be vaporized during the sulphonation reaction the organic liquid used to swell the copolymer granules is apparently retained for a time sufficient to cause increased penetration of the sulphonating agent into the granules. Sulphonation of an organic liquid used to swell the copolymer granules, concurrently with sulphonation of the copolymer itself, is not objectionable except for consumption of a portion of the sulphonating agent, since the sulphonated organic liquids are water-soluble and may readily be washed from the sulphonated copolymer. The latter, and also alkali metal and other salts thereof, are substantially insoluble in water.

Sulphonation of the swollen copolymer granules is usually accomplished in from 0.5 to 2.5 hours, but the time required for the reaction may sometimes be shorter or longer than just stated. After completing the reaction, the product is recovered either by gradually diluting the sulphonation mixture with an equal weight or more of water, filtering or decanting, and washing the residual product with water so as to obtain it as the free sulphonic acid, or by draining excess of sulphonating agent from the sulphonated resin and adding the latter to several parts by weight of a concentrated aqueous solution of sodium chloride or other inorganic salt, in which case the product is obtained as a salt of the sulphonated copolymer. In either such instance, it is advisable that the concentration of ionizable solutes in the aqueous liquor in contact with the product be reduced gradually, or in stepwise manner, through the range of from 40 to 5 per cent concentration so as to avoid development of internal strains in the granules sufficient to cause rupture of the latter. After bringing the concentration of the aqueous medium to 5 per cent or lower, the sulphonated copolymer may be washed with water alone so as to obtain it in a form suitable for use in ion exchange processes. The operations of diluting the liquor in contact with the sulphonated copolymer and of washing the latter with water are usually effective in removing any liquid organic swelling agent remaining together with the product after completion of the sulphonation reaction.

By the method just described, sulphonated copolymers of styrene, ethyl-vinylbenzene and from 6 to 11 per cent of divinylbenzene, having cation absorption values corresponding to from 20,000 to 53,000 grains of calcium carbonate per cubic foot of a bed of the granular sulphonated copolymer, have been produced in excellent yield as granular material of from 20 to 60 mesh granule size, without loss of more than 5 per cent of the copolymer due to formation of finer particles. The granular products are stable and withstand use in usual ion exchange processes without appreciable loss due to shattering or spalling of the granules.

The following examples describe ways in which the invention has been applied and illustrate certain of its advantages, but are not to be construed as limiting the invention.

EXAMPLE 1

Fifty eight and one-half parts by weight of a solution containing approximately 10 per cent by weight of divinylbenzene, 26 per cent of ethyl-vinylbenzene, and the remainder styrene is treated with 0.3 part of benzoyl peroxide. The resultant solution is admixed with 200 parts of a suspension of 0.7 per cent by weight of a finely divided sodium salt of carboxymethyl-cellulose in water. The mixture is stirred at a rate such as to disperse the styrene-containing solution in the aqueous medium as droplets corresponding approximately to the size of resin granules desired as a product. While continuing the stirring, the mixture is heated at temperatures of from 60° to 90° C. for a period of about 90 hours with gradual increase of the temperature within the range just given. The droplets in suspension are thereby polymerized to solid spherical granules. The granules are removed from the medium, washed with water and dried. By this procedure, the copolymer is readily obtained as spherical, or egg-shaped, granules of sizes between 20 and 60 mesh.

EXAMPLE 2

A body of rounded granules of a copolymer having the composition given in Example 1, and prepared by procedure similar to that set forth in said example, but containing 90 per cent by volume or more of substantially spherical granules of sizes between 20 and 40 mesh, was divided into five portions. All except one of these portions were treated individually with tetrachloroethylene in the proportion given in the following table and were caused to swell by absorption of the tetrachloroethylene. Both the unswollen portion of the granular copolymer and also each of the portions of swollen granules was treated with sulphuric acid of 98 per cent concentration in amount corresponding to five times the weight of the copolymer thus treated. Each resultant mixture was heated at a temperature of 160° C. until sulphonation had occurred to an extent such that a portion of the resin, when withdrawn from the mixture and washed free of adhering sulphuric acid with water, had an ion absorptive capacity corresponding to about 50,000 grains of calcium carbonate per cubic foot of a bed of the granular material. The time of heating at 160° C. required to accomplish this degree of sulphonation was noted. Each sulphonation mixture was gradually diluted with water by stirring the mixture while exposing it to a fine spray of water until the aqueous sulphuric acid in contact with the granular material was of about one per cent concentration. The liquor was then drained from the granules and the latter were washed free of sulphuric acid with water. The granular product was inspected to determine the per cent of the granules of the copolymer which had been cracked or shattered during the operations of sulphonating the same and of freeing the sulphonated granules of sulphuric acid. Table I gives the proportion of tetrachloroethylene used in each experiment, expressed as per cent of the weight of the copolymer treated therewith. It also gives the hours of heating of each sulphonation mixture required to sulphonate the copolymer to the extent stated above, and the per cent of the granules of the copolymer which were cracked or shattered during the operations of sulphonating the granules and of freeing them of adhering sulphuric acid. In the table tetrachloroethylene is designated by its empirical formula, $C_2Cl_4$.

Table I

| Percent $C_2Cl_4$ | Sulphonation Time, Hrs. | Percent of Granules Cracked |
|---|---|---|
| 0 | 3 | 25 |
| 15 | 2.5 | 8.5 |
| 25 | 2 | 7 |
| 37.5 | 1.5 | 4 |
| 50 | 1 | 3 |

EXAMPLE 3

The experiments of Example 2 were repeated using a granular resin of the same composition and prepared in the same way, but the spherical granular material used in the several sulphonation experiments was first screened so as to be composed of granules of from 20 to 24 mesh size. Table II gives the proportion of tetrachloroethylene used to swell the copolymer granules in each experiment and the per cent of such granules which were cracked or shattered during the operations of sulphonating the granules and of gradually displacing, with water, the sulphuric acid in contact with the sulphonated granules.

Table II

| Per Cent $C_2Cl_4$ | Per Cent of Granules Cracked |
|---|---|
| 0 | 88 |
| 5 | 43 |
| 10 | 21 |
| 25 | 5 |
| 50 | 0 |

The method, as herein described, may be applied with advantage in producing other sulphonated copolymers of monovinyl- and polyvinyl-aromatic compounds in a granular form suitable for use as cation exchange agents. Examples of such other copolymers which may be employed in the method of this invention are the copolymers of ethyl-styrene with from 5 to 10 per cent of divinylbenzene, copolymers of methyl-styrene (i. e. vinyl-toluene) with from 5 to 10 per cent of divinylbenzene, copolymers of di-methyl-styrene (i. e. vinyl-xylene) with from 5 to 10 per cent of divinylbenzene, copolymers of para-chlorostyrene with from 5 to 10 per cent of divinylbenzene, and copolymers of dichlorostyrene (i. e. vinyl-dichlorobenzene) with from 5 to 10 per cent of divinylbenzene, etc. These granular copolymers may be sulphonated to obtain resinous products having ion absorptive capacities corresponding to more than 5,000 grains of calcium carbonate per cubic foot of the resin bed and, in many instances, corresponding to more than 30,000 grains of calcium carbonate per cubic foot of the granular bed.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. The method which comprises treating a body of a benzene-swellable copolymer of vinyl aromatic hydrocarbons comprising styrene and divinylbenzene, the latter being in a proportion corresponding to between 3 and 11 per cent of the combined weight of the vinyl aromatic compounds chemically combined in the copolymer, which copolymer is in the form of granules of from 10 to 60 mesh size, with at least 5 per cent of its weight of an organic liquid capable of dissolving polystyrene, whereby the granules are swollen by absorption of said organic liquid, treating the swollen granular material with a sulphonating agent and sulphonating the granules by heating the mixture at a reaction temperature.

2. The method, as described in claim 1, wherein the swollen granules are sulphonated by heating the same together with at least an equal weight of concentrated sulphuric acid at reaction temperatures between 100° and 200° C.

3. The method, as described in claim 1, wherein the copolymer granules are swollen by treatment with at least 15 per cent of their weight of tetrachloroethylene and the granules are sulphonated by heating them, in swollen condition, together with at least an equal weight of concentrated sulphuric acid at temperatures of from 150° to 180° C.

4. The method which comprises treating a body of a benzene-swellable copolymer of vinyl aromatic hydrocarbons comprising styrene and divinylbenzene, the latter being in a proportion corresponding to between 3 and 11 per cent of the combined weight of the vinyl aromatic compounds chemically combined in the copolymer, which copolymer is in the form of granules of from 10 to 60 mesh size, with at least 5 per cent of its weight of an organic liquid capable of dissolving polystyrene, whereby the granules are swollen by absorption of said organic liquid, treating the swollen granular material with a sulphonating agent, sulphonating the granules by heating the mixture at a reaction temperature, thereafter gradually reducing, by dilution with water, the concentration of ionizable solutes in the liquor in contact with the sulphonated granules to a concentration of less than 5 per cent by weight, separating the granules from the diluted liquor and washing the granular product with water.

5. The method, as described in claim 4, wherein the swollen granules are sulphonated by heating the same together with at least an equal weight of concentrated sulphuric acid at reaction temperatures between 100° and 200° C.

6. The method, as described in claim 4, wherein the copolymer granules are swollen by treatment with at least 15 per cent of their weight of tetrachloroethylene and the granules are sulphonated by heating them in swollen condition together with at least an equal weight of concentrated sulphuric acid at temperatures of from 140° to 180° C.

7. In a method wherein a benzene-swellable copolymer of at least one monovinyl-aromatic compound, of the class consisting of monovinyl-aromatic hydrocarbons and ar-monochloro-monovinyl-aromatic hydrocarbons, and from 3 to 20 per cent by weight of a polyvinyl-aromatic hydrocarbon is sulphonated by reaction with a sulphonating agent, the improvement which consists in swelling the copolymer by contacting the same with an organic liquid capable of swelling polystyrene and thereafter reacting the swollen copolymer with the sulphonating agent.

8. In a method wherein a benzene-swellable copolymer of a monovinyl-aromatic hydrocarbon and a polyvinyl-aromatic hydrocarbon, the latter being in amount corresponding to from 3 to 20 per cent of the combined weight of the vinyl aromatic hydrocarbons chemically combined in the copolymer, is sulphonated by reaction with a sulphonating agent, the improvement which consists in swelling, by at least 5 per cent of their initial volume, granules of the copolymer by treating the granular copolymer with an organic liquid capable of dissolving polystyrene, treating the swollen copolymer granules with a sulphonating agent and sulphonating the granules by reacting the same with said agent.

9. In a method wherein a benzene-swellable copolymer of a monovinyl-aromatic hydrocarbon and a polyvinyl-aromatic hydrocarbon, the latter being in amount corresponding to from 3 to 11 per cent of the combined weight of the vinyl aromatic hydrocarbons chemically combined in the copolymer, is sulphonated by reaction with a sulphonating agent, the improvement which consists in treating a body of the copolymer in the form of granules of from 10 to 60 mesh size with at least 5 per cent of its weight of an organic liquid capable of dissolving polystyrene, whereby the granules are swollen by absorption of said organic liquid, treating the swollen copolymer granules with a sulphonating agent and sulphonating the granules by heating the mixture to a reaction temperature.

RAYMOND F. BOYER.

REFERENCES CITED

The following references are of record in the file of this patent:

UNITED STATES PATENTS

| Number | Name | Date |
|---|---|---|
| 2,341,175 | Britton | Feb. 8, 1944 |
| 2,366,007 | D'Alelio | Dec. 26, 1944 |
| 2,395,347 | Sharkey | Feb. 19, 1946 |
| 2,466,675 | Bauman | Apr. 12, 1949 |

FOREIGN PATENTS

| Number | Country | Date |
|---|---|---|
| 367,416 | Great Britain | Feb. 15, 1932 |